United States Patent
Guo et al.

(10) Patent No.: US 12,512,122 B2
(45) Date of Patent: Dec. 30, 2025

(54) DATA STORAGE DEVICE WITH SERVO BURST SIGNAL CORRECTION FOR MITIGATING EFFECTS OF SERVO PATTERN DISTORTION

(71) Applicant: WESTERN DIGITAL TECHNOLOGIES, INC., San Jose, CA (US)

(72) Inventors: Guoxiao Guo, Irvine, CA (US); Yun Hong, San Jose, CA (US); Kei Yasuna, Fujisawa (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/612,541

(22) Filed: Mar. 21, 2024

(65) Prior Publication Data
US 2025/0299694 A1    Sep. 25, 2025

(51) Int. Cl.
G11B 5/596    (2006.01)

(52) U.S. Cl.
CPC ................ G11B 5/59688 (2013.01)

(58) Field of Classification Search
CPC . G11B 5/59688; G11B 7/1263; G11B 13/045; G11B 27/36; G11B 2005/0018; G11B 2005/0021; G11B 7/0938; G11B 2220/2516; G11B 5/54; G11B 5/09; G11B 20/12; G11B 5/56
USPC ................................ 360/77.01, 75
See application file for complete search history.

(56) References Cited

U.S. PATENT DOCUMENTS

| | | |
|---|---|---|
| 5,946,158 A | 8/1999 | Nazarian et al. |
| 6,369,971 B1 | 4/2002 | Everett |
| 6,369,974 B1 | 4/2002 | Asgari et al. |
| 7,616,399 B1 | 11/2009 | Chen et al. |
| 7,916,422 B1 | 3/2011 | Guo et al. |
| 8,054,568 B2 | 11/2011 | Cherubini et al. |
| 8,531,798 B1 | 9/2013 | Xi et al. |
| 8,717,704 B1 | 5/2014 | Yu et al. |

(Continued)

FOREIGN PATENT DOCUMENTS

| | | |
|---|---|---|
| EP | 0903559 A2 | 3/1999 |
| WO | 2015041605 A1 | 3/2015 |

OTHER PUBLICATIONS

Ma Kun, "Servo pattern enhancements for high areal density hard disk drives", https://dr.ntu.edu.sg/bitstream/10356/72656/1/SERVO%20PATTERN%20ENHANCEMENTS%20FOR%20HIGH%20AREAL%20DENSITY%20HARD%20DISK%20DRIVES.pdf, School of Electrical & Electronic Engineering, Year 2017, 178 Pages.

*Primary Examiner* — Nabil Z Hindi
(74) *Attorney, Agent, or Firm* — Calderon Safran & Wright P.C.

(57) ABSTRACT

Various illustrative aspects are directed to a data storage device, method, and one or more processing devices that are configured to: obtain a first value of a first servo burst signal and a second value of a second servo burst signal associated with a servo pattern in a track of the disk; calculate an adjusted first value and an adjusted second value by adjusting one or both of the first value and the second value based on a measure of servo pattern distortion associated with the track; generate a position error signal (PES) using the adjusted first value and the adjusted second value; and control a position of the head over the track using the PES.

20 Claims, 7 Drawing Sheets

(56) References Cited

U.S. PATENT DOCUMENTS

| | | | |
|---|---|---|---|
| 8,749,904 B1 | 6/2014 | Liang et al. | |
| 8,970,982 B1 | 3/2015 | Zhou et al. | |
| 9,472,223 B1 | 10/2016 | Mendonsa et al. | |
| 9,514,775 B2 | 12/2016 | Keizer et al. | |
| 10,923,146 B1 | 2/2021 | Guo et al. | |
| 11,830,524 B1 * | 11/2023 | Yasuna | G11B 21/08 |

* cited by examiner

DATA STORAGE DEVICE WITH SERVO BURST SIGNAL CORRECTION FOR MITIGATING EFFECTS OF SERVO PATTERN DISTORTION

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

Figure 1:
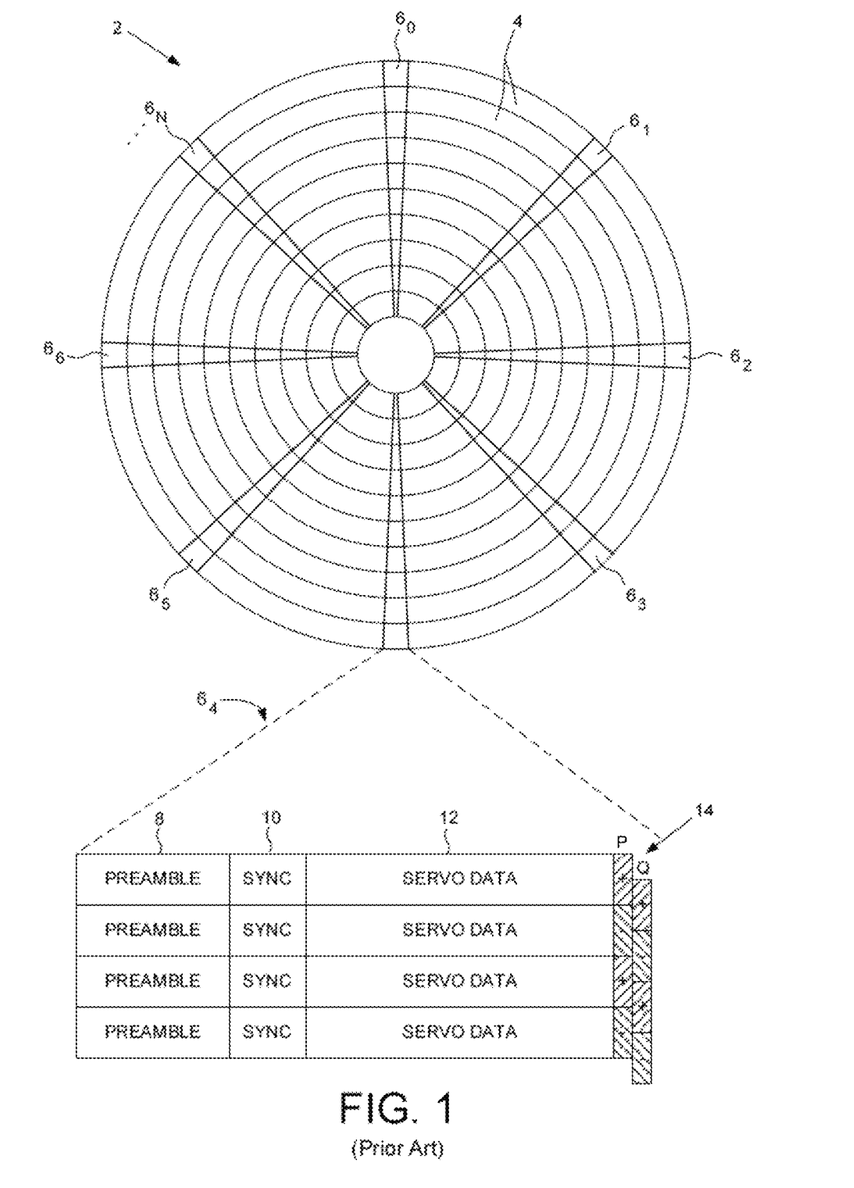
FIG. 1 shows a prior art disk format as comprising a number of radially-spaced, concentric servo tracks defined by servo wedges recorded around the circumference of each servo track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., P and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine control actuators such as milliactuators or microactuators, in some examples.

SUMMARY

Various examples disclosed herein provide data storage devices such as hard disk drives with control circuitry configured to perform novel and inventive servo burst signal correction for mitigating effects of servo pattern distortion caused by laser mode hop. In various examples, control circuitry of this disclosure is inventively configured to calculate adjusted values of servo burst signals based on a determined correction of measured values of the servo burst signals when the servo patterns have been distorted by laser mode hopping, and to use the adjusted values to generate a PES that can be used to control the position of a head over a track. In this manner, implementations help mitigate negative effects of servo pattern distortion caused by laser mode hop that occurred during writing of the servo patterns.

Various illustrative aspects are directed to a data storage device comprising a disk, a head actuated over the disk, and control circuitry configured to: obtain a first value of a first servo burst signal and a second value of a second servo burst signal associated with a servo pattern in a track of the disk; calculate an adjusted first value and an adjusted second value by adjusting one or both of the first value and the second value based on a measure of servo pattern distortion associated with the track; generate a position error signal (PES) using the adjusted first value and the adjusted second value; and control a position of the head over the track using the PES.

Various illustrative aspects are directed to a method comprising: obtaining a first value of a first servo burst signal and a second value of a second servo burst signal associated with a servo pattern in a track of a disk of a disk drive; calculating an adjusted first value and an adjusted second value by adjusting one or both of the first value and the second value based on a measure of servo pattern distortion associated with the track; generating a position error signal (PES) using the adjusted first value and the adjusted second value; and controlling a position of a head over the track using the PES, wherein the obtaining, the calculating, the generating, and the controlling are performed by one or more processing devices individually or in combination.

Various illustrative aspects are directed to one or more processing devices comprising: means for obtaining a first value of a first servo burst signal and a second value of a second servo burst signal associated with a servo pattern in a track of a disk of a disk drive; means for calculating an adjusted first value and an adjusted second value by adjusting one or both of the first value and the second value based on a measure of servo pattern distortion associated with the track; means for generating a position error signal (PES) using the adjusted first value and the adjusted second value; and means for controlling a position of a head over the track using the PES.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

DETAILED DESCRIPTION

Figure 2A:
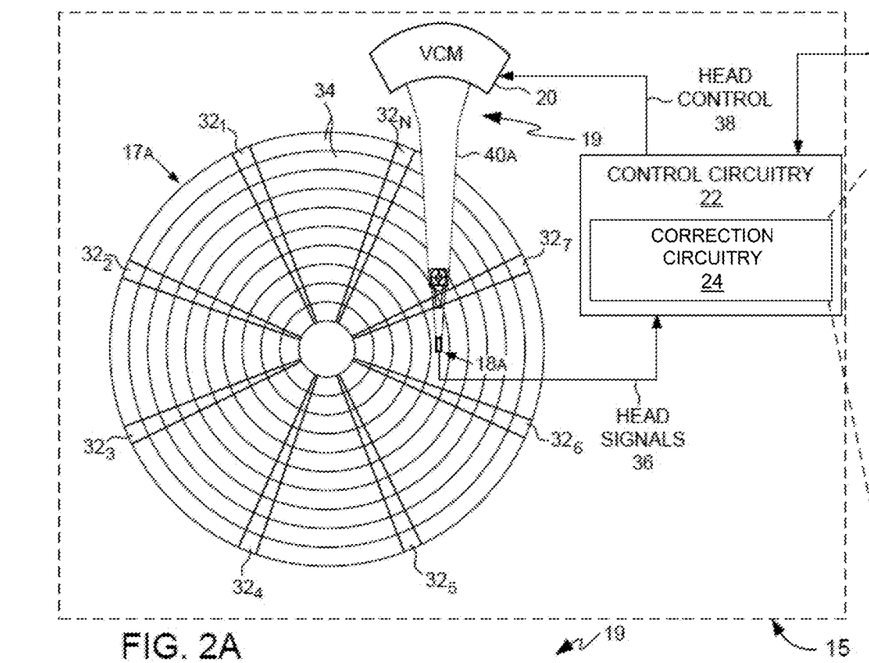
FIGS. 2A and 2B illustrate conceptual block diagrams of a top view and a side view of a data storage device in the form of a disk drive, in accordance with aspects of the present disclosure.
Figure 2B:
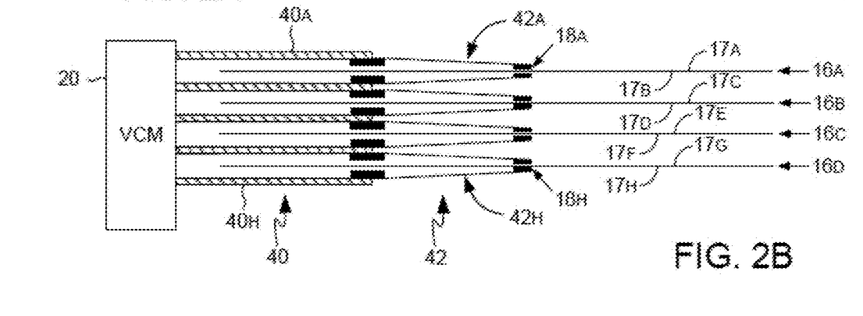
Figure 2C:
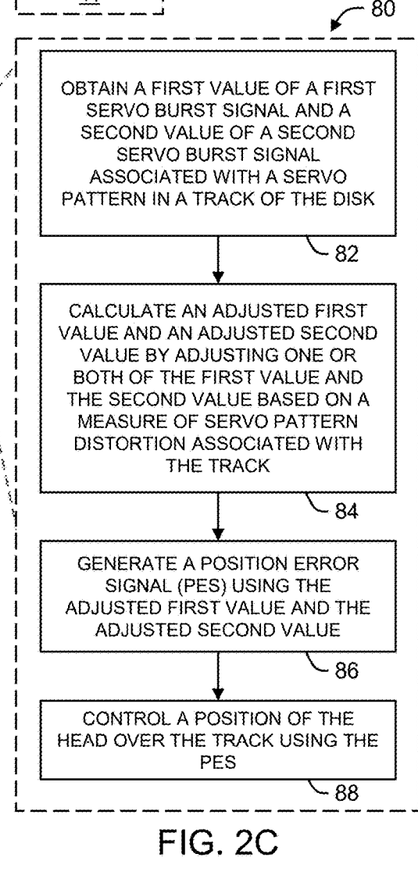
FIG. 2C depicts a flowchart for an example method that read/write channel circuitry of control circuitry of a disk drive may perform or execute in controlling the operations of the disk drive, in accordance with aspects of the present disclosure.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). FIG. 2C depicts a flowchart for an example method 80 that correction circuitry 24 of control circuitry 22 may perform or execute in controlling the operations of disk drive 15, in accordance with aspects of the present disclosure, including servo burst signal correction for mitigating effects of servo pattern distortion caused by laser mode hop in accordance with aspects of the present disclosure.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples.

Each of actuator arms 40 is configured to suspend a read/write head 18 in close proximity over a corresponding disk surface 17 (e.g., read/write head 18A suspended by topmost actuator arm 40A over topmost corresponding disk surface 17A, read/write head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one actuator in the form of VCM 20 in the example of FIGS. 2A and 2B, for example In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17. As used herein, a head 18 may be said to operate "above" a corresponding disk surface 17 in terms that define the local frame of reference in accordance therewith.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. In some examples, each of the two actuator arm assemblies may control half of the heads, and write to and read from half of the disk surfaces. In some examples, each of the actuator arm assemblies may be addressable by host 44 as a separate logical data storage unit. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In a particular example, correction circuitry 24 of control circuitry 22 may obtain a first value of a first servo burst signal and a second value of a second servo burst signal associated with a servo pattern in a track of the disk (82). Correction circuitry 24 may further calculate an adjusted first value and an adjusted second value by adjusting one or both of the first value and the second value based on a measure of servo pattern distortion associated with the track (84). Control circuitry 22 may further generate a position error signal (PES) using the adjusted first value and the adjusted second value (86). Control circuitry 22 may further control a position of the head over the track using the PES (88). Control circuitry 22, including correction circuitry 24, may further perform additional actions, methods, and techniques, in accordance with various aspects including as further described herein.

The term "correction circuitry 24" as used herein may refer to any hardware, firmware, software, and/or combination thereof, comprised in control circuitry 22 of disk drive 15, which implements, embodies, or engages in any of the structures or functions ascribed herein to correction circuitry 24 or to any other of the novel and inventive aspects of the present disclosure. Correction circuitry 24 may constitute any hardware, firmware, software, and/or any other elements of control circuitry 22 for performing servo burst signal correction for mitigating effects of servo pattern distortion caused by laser mode hop, and performing other techniques and methods as described herein.

In embodiments, disk drive 15 comprises a heat-assisted magnetic recording (HAMR) disk drive. HAMR disk drives enable high-quality written data at high densities enabled by a high-coercivity medium of a disk surface, such as, e.g., superparamagnetic iron-platinum nanoparticles, by heating the disk surface with a laser emitted by a laser diode during write operations. Such heating of the disk surface decreases the coercivity of the magnetic medium of the disk surface, thereby enabling the magnetic field generated by the write coil of a write element to magnetize the temporarily heated area of the disk surface. The disk surface encoding the data thus written then cools back down and thereby returns to heightened magnetic coercivity, which durably preserves the written data at higher density than is possible in conventional techniques such as perpendicular magnetic recording (PMR).

Figure 2D:
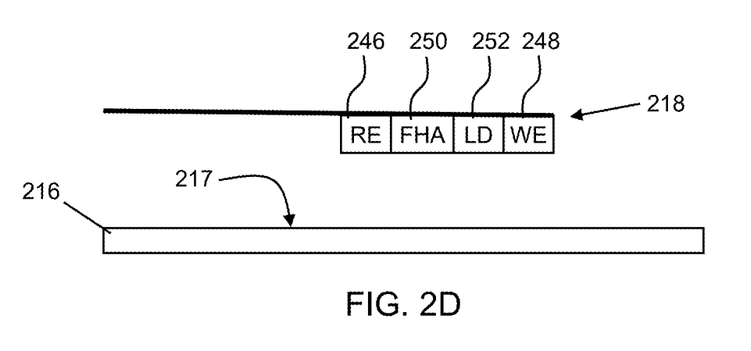
FIG. 2D depicts an example head usable in a HAMR disk drive in accordance with aspects of the present disclosure.

FIG. 2D depicts an example head 218 usable in a HAMR disk drive. In particular, FIG. 2D shows a disk 216 that corresponds to one of disks 16 of FIG. 2B and a head 218 that corresponds to one of heads 18 of FIG. 2B. The arrangement or disposition of elements of heads 18 of FIG. 2B described herein is not limited to any specific detail as shown in FIG. 2D, and the elements of heads 18 of FIG. 2B may be arranged in any of a variety of other configurations in other examples.

With continued reference to FIG. 2D, in embodiments head 218 includes a read element 246 (e.g., a magnetoresistive (MR) element), a write element 248 (e.g., an inductive write coil), a fly height actuator 250 (e.g., a thermal fly height control (TFC) element that actuates through thermal expansion or a piezoelectric actuator that actuates through mechanical deflection), and a laser diode 252. Control circuitry 22 (shown in FIG. 2A) writes data to disk surface 217 by modulating a write current in an inductive write coil in write element 248 to record magnetic transitions onto corresponding disk surface 217 in a process referred to as saturation recording. During readback, read element 246 senses the magnetic transitions, and a read channel demodulates the resulting read signal. Control circuitry may use fly height actuator 250 to induce changes in the fly height of head 218 above disk surface 217. Laser diode 252 may be used to generate a laser that is used to temporarily heat an area of disk surface 217 prior to passing under write element 248, as is understood in a HAMR disk drive. For example, laser diode 252 may be used with a waveguide and a near-field transducer (NFT) to project a plasmon onto disk surface 217 to heat an area of disk surface 217.

HAMR disk drives are susceptible to the phenomenon of mode hop (also called laser mode hop, mode hopping, and laser mode hopping) in which the output of the laser diode changes suddenly and unpredictably. In the example of FIG. 2D, when power (e.g., driving current) is applied to laser diode 252 during write operations, laser diode 252 may exhibit sudden and unpredictable changes between two or more available modes in which it emits a laser, due to the inherent physics of laser emission, which cause transients, or sudden shifts in magnitude, in output power of the laser being emitted by laser diode 252. Because such laser mode hopping can create sudden, unpredictable changes in the laser power, laser mode hopping may also cause sudden, unpredictable write width changes, even while the write current applied to write element 248 remains constant. That is, a greater or lesser width across the disk surface 217 may be susceptible to the constant write current in response to the laser suddenly becoming more or less powerful, respectively. When such changes in write width occur during servo write (i.e., when writing servo bursts to the disk), laser mode hopping may cause distortion of servo patterns in a servo wedge. Such distortion of the servo patterns may be referred to as DC bimodal distortion, or simply as "DC bimodal," and may result in degraded operational issues of disk drive 15 such as DC squeeze (also called track squeeze) and/or large repeatable runout (RRO) error. Laser mode hopping is thus an undesirable characteristic of HAMR systems and has proven difficult to eliminate. Accordingly, aspects of the present disclosure are directed to systems and methods that mitigate the impact of servo pattern distortion caused by laser mode hopping, among other advantages.

Figure 3A:
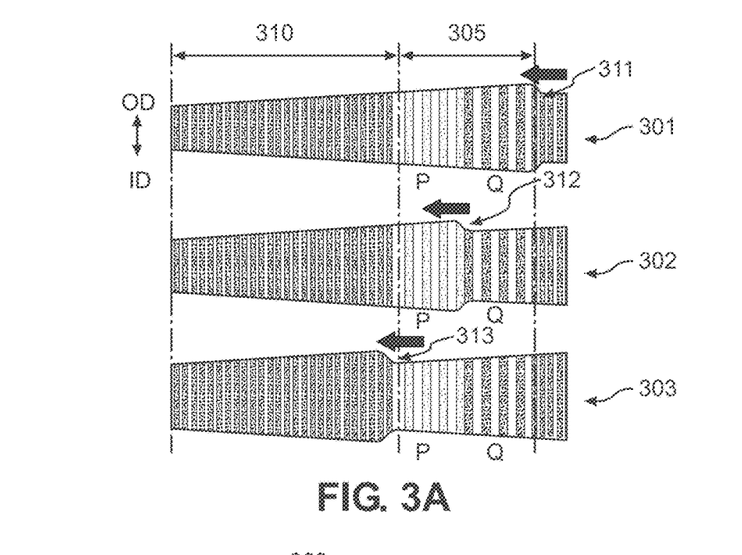
FIGS. 3A-3C depict the mechanism of DC bimodal distortion caused by laser mode hopping.
Figure 3B:
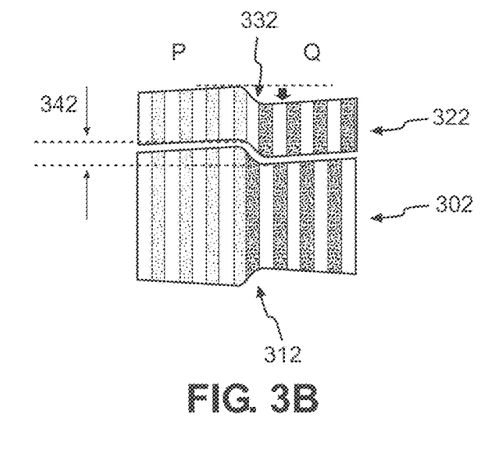
Figure 3C:
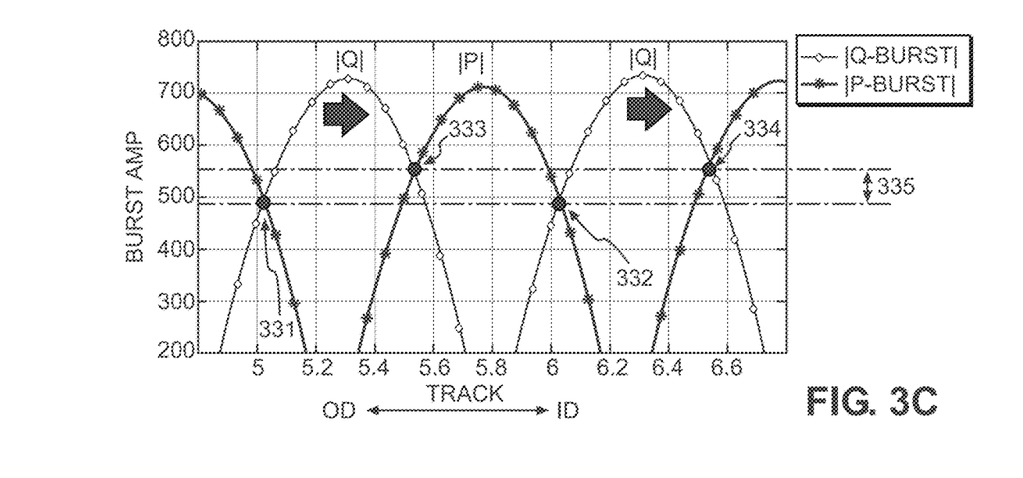

FIGS. 3A-3C depict illustrative examples of the mechanism of DC bimodal distortion caused by laser mode hopping. FIG. 3A depicts examples of elemental servo patterns generated at a servo writing process. Servo patterns may comprise patterns of servo bursts similar to servo bursts 14 of FIG. 1. Elemental servo patterns 301, 302, 303 illustrate three example cases that each has write width change while writing a single servo wedge. Each of elemental servo patterns 301, 302, 303 comprises a block 310 and a block 305. Block 310 in each of elemental servo patterns 301, 302, 303 is comprised of preamble, servo address mark (SAM) or servo index mark (SIM), and gray coded track information. Block 305 in each of elemental servo patterns 301, 302, 303 comprises a Q burst and a P burst, which comprise servo bursts similar to servo bursts 14 of FIG. 1, and which together form a null burst pattern or simply servo pattern. In the servo writing process, control circuitry 22 may write elemental servo pattern 302 overlapped with a previous elemental servo pattern 322 by adding a half-track radial offset, as shown in FIG. 3B. Control circuitry 22 may iterate this write and move operation to form a servo wedge, e.g., servo wedges 32 in FIG. 2A, across the stroke on a disk surface 17.

FIG. 3A depicts sudden, unpredicted write width change patterns 311, 312, 313 caused by laser mode hop as described herein, in elemental servo patterns 301, 302, 303, respectively. The slowly increasing trend over time (i.e., left to right) of write width of elemental servo patterns 301, 302, 303 is attributed to regular write transient due to ramp-up of laser power. The occurrence of the mode hop-induced write width change is not completely random when writing servo wedges. In most cases, the write width changes like write width change patterns 311, 312, 313 show up at almost the same down-track location of every wedge while writing a few thousands of tracks. As the process goes further over time and as servo writing proceeds radially across disk surface 17, the down-track location of write width change pattern 311 may gradually shift to the locations of write width change patterns 312 and/or 313. As a null burst pattern is formed by stitching polarity flipped patterns, a case when the write width change overlaps the burst area as shown in elemental servo pattern 302 and write width change pattern 312 has greater impact on servo positioning operation of disk drive 15, relative to cases in which a write width change lies outside of the burst area, as in write width change patterns 311 and 313.

FIG. 3B shows a magnified view of the distortion of the Q burst and the P burst caused by the write width change pattern 312 overlapping the null burst pattern of elemental servo pattern 302 as shown in FIG. 3A, which is subsequently written adjacent to and partially overlapping elemental servo pattern 322 having a similarly distorted write width change pattern 332 between that track's Q burst and P burst. As shown in FIG. 3B, when write width change patterns 312, 332 overlap the null burst patterns, a burst transition edge may be consistently radially shifted relative to adjacent null burst patterns in adjacent elemental servo patterns 302, 322. In the example shown in FIG. 3B, the Q burst is radially shifted by the distortion caused by write width changes such as Q burst write width change patterns 312 or 332. As a result, the pattern edge of the Q burst is shifted from its nominal position, creating the radial location difference 342 in the Q burst when the burst changes polarity.

FIG. 3C shows an exemplary cross-track profile of servo burst signals of the Q burst and the P burst that result from the distortion of the null burst patterns as depicted in FIG. 3B. In embodiments, servo burst signals are generated from reading the servo bursts in a servo pattern. In the example shown in FIG. 3C, the Q burst edge is placed on the inner diameter (ID) side relative to the P burst edge by the shift amount 342. As shown in FIG. 3C, due to the radially shifted profile of one burst relative to the other burst, the amplitude of the crossing levels 331, 332 at the integer locations differs from the amplitude of the crossing levels 333, 334 at the half-integer locations, as indicated by delta 335. This crosspoint split (also referred to as DC bimodal herein) results from laser mode hop occurring during writing of the null burst pattern and leads to distortion of fractional servo pattern track position scale as well as undesirable DC track misregistration. Delta 335 having a magnitude of zero indicates that mode hop did not occur in the region corresponding to the pair of bursts in the null burst pattern. Delta 335 having a magnitude of greater than zero indicates that mode hop occurred in the region corresponding to the pair of bursts in the null burst pattern. The greater the magnitude of delta 335, the greater the degree of DC bimodal and the greater the detrimental effect resulting from the mode hop. The magnitude of delta 335 is thus usable as a measure of servo pattern distortion associated with the track.

Figure 4:
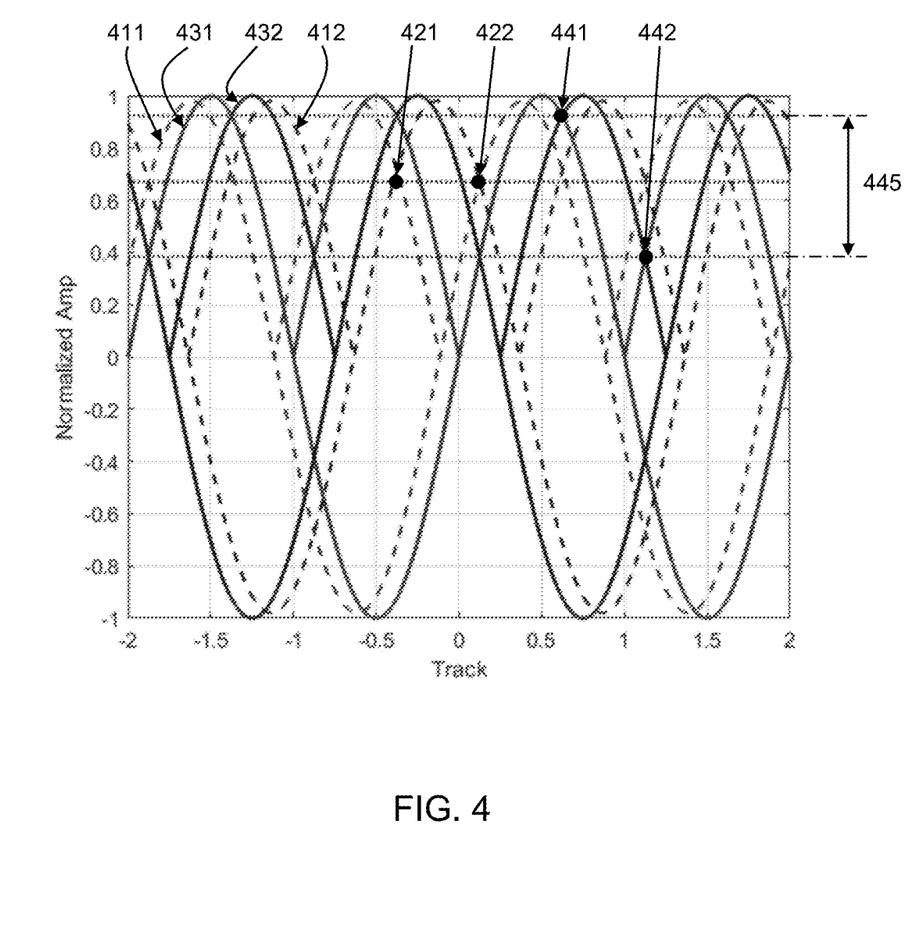
FIG. 4 shows an exemplary cross-track profile of servo burst signals that result from distortion of a servo pattern.

FIG. 4 shows another exemplary cross-track profile of servo burst signals of a Q burst and a P burst that result from distortion of a servo pattern as described herein. In the example shown in FIG. 4, profiles 411 and 412 correspond to ideal non-shifted profiles of servo burst signals of the Q burst and the P burst, respectively, when there is no servo pattern distortion caused by laser mode hopping. As shown in FIG. 4, there is no delta between the amplitudes of the crossing levels 421 and 422 associated with these profiles 411 and 412. In this ideal scenario, the P shape (or "profile") and Q burst shape repeat every two tracks, and the Q burst profile is spaced a half a track away from the P burst. In this scenario, the fundamental harmonic of this burst profile has a period of $2\pi$ angle or 360 degrees at every two tracks; the nominal phase difference between P and Q burst of halftrack is $\pi/2$, or 90 degrees. In the example shown in FIG. 4, profiles 431 and 432 correspond to shifted profiles of servo burst signals of the Q burst and the P burst, respectively, due to distortion in the written servo pattern caused by laser mode hopping. As shown in FIG. 4, profiles 431 and 432 are shifted along the horizontal axis relative to profiles 411 and 412 (i.e., shifted from their ideal position of being a half-track away from one another), which results in delta 445 between the amplitudes of the crossing levels 441 and 442 associated with these profiles 431 and 432. Delta 445, like delta 335 of FIG. 3, may be used as a measure of servo pattern distortion associated with the track.

Figure 5:
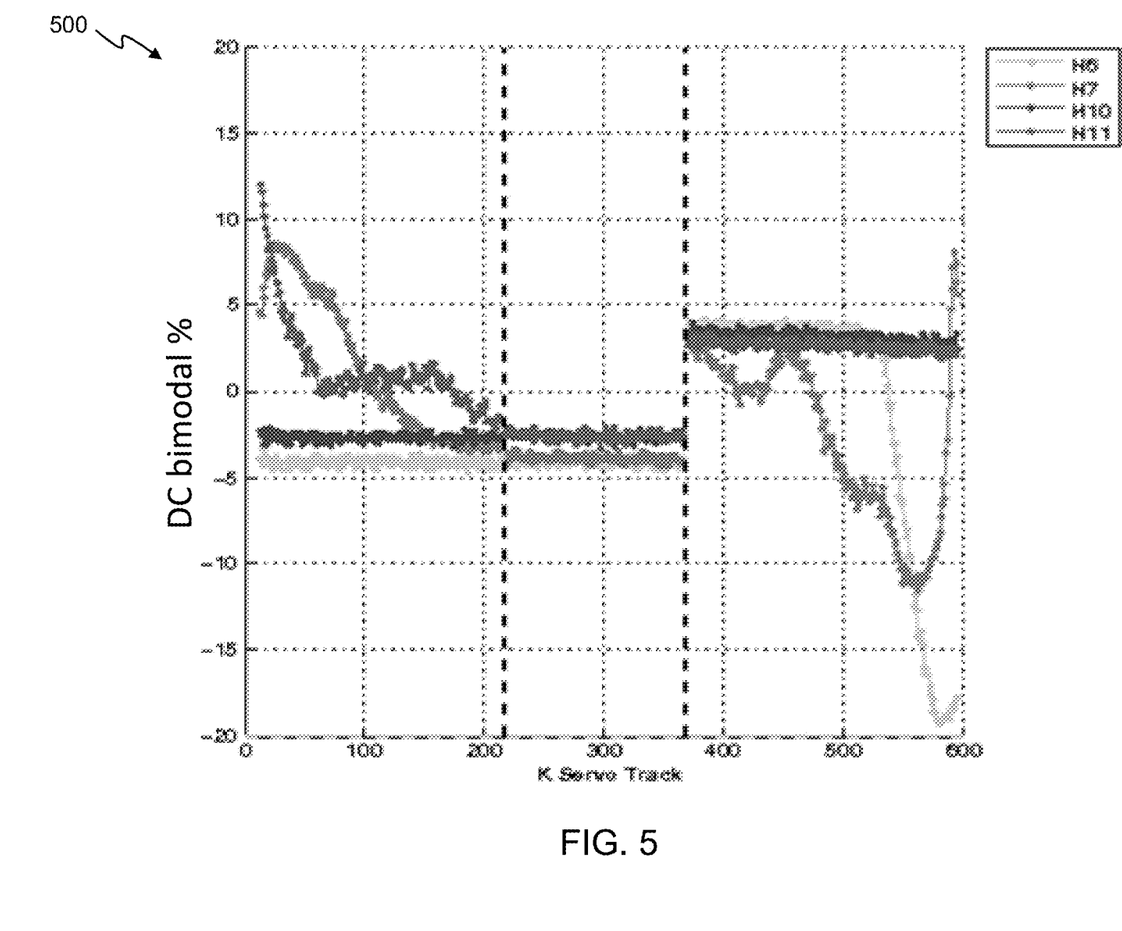
FIG. 5 shows a graph of exemplary measures of servo pattern distortion associated with tracks and heads of a disk drive.

FIG. 5 shows a graph 500 of exemplary measures of servo pattern distortion associated with tracks and heads of a disk drive such as disk drive 15 of FIG. 2A. In FIG. 5, the vertical axis represents magnitude of difference between crossing level amplitudes associated with a first servo burst signal profile and a second servo burst signal profile of a track, and the horizontal axis represents track number. As shown in FIG. 5, a measure of servo pattern distortion may be determined for each track (i.e., track 0 through 600 in this example) of each head (i.e., heads H6, H7, H10, and H11 in this example). As shown in FIG. 5, different respective tracks associated with a single head may have different respective measures of servo pattern distortion. The respective measures of servo pattern distortion for the respective tracks may be determined when the disk drive is manufactured, e.g., by measuring a value of delta (e.g., similar to delta 445 of FIG. 4) associated with servo burst signal profiles of a track after writing the servo patterns to the disk. The values may be converted via a desired mathematical function or transformation (e.g., scaled, normalized, etc.) to a desired scale and range.

As demonstrated by FIGS. 3 and 4, servo burst signals may have shifted profiles (i.e., shifted away from ideal profile positions) that result from servo pattern distortion caused by laser mode hop that occurs during writing of the servo patterns. Using such servo burst signals having shifted profiles to generate a PES for a head in a disk drive can result in track misregistration, which can cause undesirable track squeeze and/or large RRO error. Embodiments of the present disclosure address this problem by performing a correction of measured values of servo burst signals when the servo patterns have been distorted by laser mode hopping. Embodiments perform the correction by: determining a measure of servo pattern distortion associated with the track (e.g., such as a delta between the amplitudes of crossing levels associated of servo burst signal profiles associated with the track); using the measure of servo pattern distortion to determine correction factors; and using the correction factors with the measured values of servo burst signals to calculate adjusted values of servo burst signals for the track, which may be used to generate a PES for controlling the position of the head over the track. In embodiments, the adjusted values of the servo burst signals that are calculated using the correction factors coincide with target profiles of servo burst signals (e.g., such as profiles 411 and 412). In this manner, embodiments perform servo burst signal correction for mitigating effects of servo pattern distortion caused by laser mode hopping.

Figure 6:
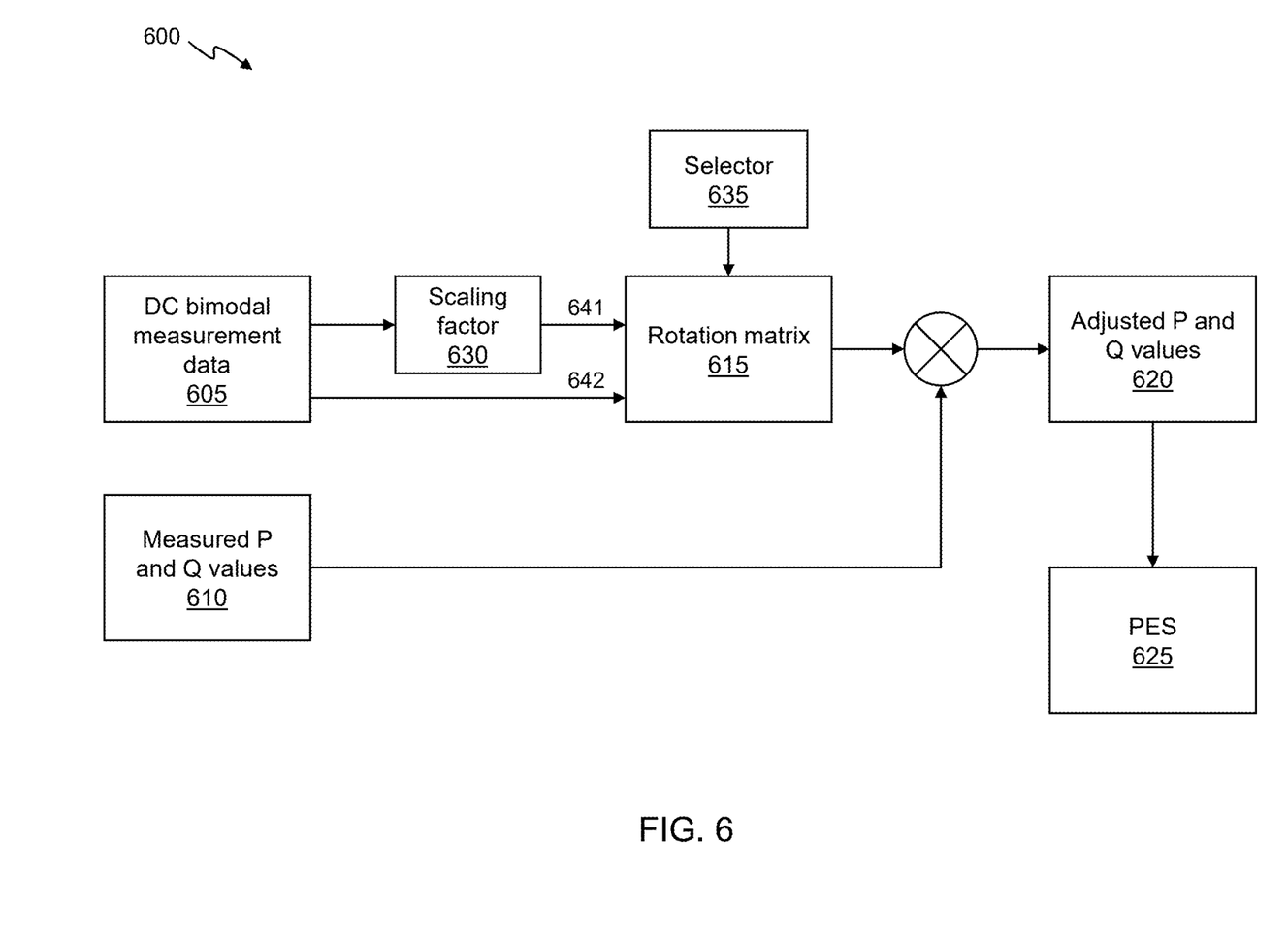
FIG. 6 shows a block diagram of a servo burst signal correction algorithm in accordance with aspects of the present disclosure.

FIG. 6 shows a block diagram of a servo burst signal correction algorithm in accordance with aspects of the present disclosure. In embodiments, DC bimodal measurement data 605 represents data defining a measure of servo pattern distortion associated with a track. In one example, DC bimodal measurement data 605 comprises data similar to that shown in FIG. 5, i.e., respective measures of servo pattern distortion determined for the respective tracks associated with one or more respective heads in a disk drive. Embodiments are not limited to using DC bimodal measurement data 605 as the measure of servo pattern distortion, and other quantifiable measures of servo pattern distortion may be used.

With continued reference to FIG. 6, measured P and Q values 610 represent a first value associated with a first servo burst signal and a second value associated with a second servo burst signal associated with a servo pattern in a track of the disk. In embodiments, the first servo burst signal is generated by reading a first portion of the servo pattern using a read element (such as read element 246) of the head, and the second servo burst signal is generated by reading a second portion of the servo pattern using the read element as the head passes over the servo pattern. In embodiments, measured P and Q values 610 represent respective values of these respective signals that are obtained in real time by reading of the servo pattern. In embodiments, control circuitry 22 of FIG. 2A obtains measured P and Q values 610 based on an output of read element 246 by reading the servo pattern.

Still referring to FIG. 6, rotation matrix 615 comprises a matrix containing correction factors associated with a track. In embodiments, the correction factors in rotation matrix 615 are determined based on the DC bimodal measurement data 605 for the track. Plural different instances of rotation matrix 615 may be determined for a single track based on different methods of determining the correction factors as described herein.

Adjusted P and Q values 620 in FIG. 6 represent an adjusted first value and an adjusted second value determined by adjusting one or both of measured P and Q values 610 using the correction factors of rotation matrix 615. In embodiments, correction circuitry 24 of FIG. 2A calculates adjusted P and Q values 620 using measured P and Q values 610 obtained from control circuitry 22 and correction factors of rotation matrix 615, which may be stored in firmware for example. The following equations show one example of determining adjusted P and Q values 620 in this manner.

$$\begin{bmatrix} P_{adj} \\ Q_{adj} \end{bmatrix} = \begin{bmatrix} M_{11} & M_{12} \\ M_{21} & M_{22} \end{bmatrix} \begin{bmatrix} P \\ Q \end{bmatrix} \quad (1)$$

$$P_{adj} = P * M_{11} + Q * M_{12} \quad (2)$$

$$Q_{adj} = P * M_{21} + Q * M_{22} \quad (3)$$

In Equations 1-3 above, $P_{adj}$ and $Q_{adj}$ represent adjusted P and Q values 620, P and Q represent measured P and Q values 610, and $M_{11}$, $M_{12}$, $M_{21}$, and $M_{22}$ represent correction factors included in rotation matrix 615. In embodiments, a different respective rotation matrix 615 containing such correction factors may be determined for each respective track based on the respective DC bimodal measurement data 605 associated with a respective track. In this manner, each respective track may be provided with its own correction based on its own measure of servo pattern distortion, since the degree of servo pattern distortion may change from one track to another across the stroke of a head.

PES 625 of FIG. 6 represents a PES generated using adjusted P and Q values 620. In embodiments, control circuitry 22 of FIG. 2A generates PES 625 using adjusted P and Q values 620, e.g., in a manner similar to generating a PES described with respect to FIGS. 2A and 2B. Control circuitry 22 may use PES 625 to control a position of the head over the track, e.g., in a manner similar to that described with respect to FIGS. 2A and 2B.

With further reference to FIG. 6, scaling factor 630 comprises a factor that may be used to scale the value of DC bimodal measurement data 605 prior to determining the correction factors in rotation matrix 615. In embodiments, scaling factor 630 comprises an integer or real number by which the value of DC bimodal measurement data 605 is multiplied. Scaling factor 630 may be determined empirically, for example, by searching for a value of the scaling factor that minimizes the DC bimodal measurement data of the adjusted P and Q bursts.

Selector 635 of FIG. 6 represents a selection to adjust only one or both of measured P and Q values 610 using the correction factors of rotation matrix 615. In one embodiment, only a single one of measured P and Q values 610 is adjusted when calculating adjusted P and Q values 620. In another embodiment, both measured P and Q values 610 are adjusted when calculating adjusted P and Q values 620. For example, a single head is associated with plural tracks, and each respective one of the tracks has a respective measure of servo pattern distortion (e.g., as depicted in FIG. 5). In one embodiment, when all of the respective measures of servo pattern distortion of all the tracks associated with a head are below a threshold value, then only a single one of measured P and Q values 610 is adjusted when calculating adjusted P and Q values 620. In another embodiment, when one or more of the respective measures of servo pattern distortion of all the tracks associated with a head are above a threshold value, then both measured P and Q values 610 are adjusted when calculating adjusted P and Q values 620.

With continued reference to FIG. 6, path 641 represents determining a first set of correction factors based on DC bimodal measurement data 605 using a first method, and path 642 represents determining a second set of correction factors based on DC bimodal measurement data 605 using a second method different than the first method. In one example, the first method includes deriving first order equations based on linear estimation and using the derived equations to determine the correction factors based on DC bimodal measurement data 605. In another example, the second method includes determining the correction factors using a numerical method such as a least squares method.

In some embodiments, the correction factors included in rotation matrix 615 are determined by determining an estimated shift of the cross-track profile of the servo burst signals (referred to herein as an estimated servo burst signal shift) based on the measure of servo pattern distortion associated with the track, and determining the correction factors based on the estimated servo burst signal shift. In one example, the estimated servo burst signal shift for a track may be determined based on the measure of servo pattern distortion associated with the track according to the equation:

$$\theta = \pi \Delta / k \tag{4}$$

In Equation 4, θ is the estimated servo burst signal shift, Δ is a measure of servo pattern distortion associated with the track (e.g., DC bimodal measurement data 605), and k is a scaling factor (e.g., scaling factor 630). In this manner, the estimated servo burst signal shift given by θ represents a measure of how much the servo burst signal profiles shifted as a result of laser mode hop estimated servo burst signal shift.

In one exemplary embodiment, the correction factors are determined based on the estimated servo burst signal shift according to Equations 5-8:

$$M_{11} = \cos(\theta/2) + (\sin(\theta/2) * \sin(\theta))/\cos(\theta) \tag{5}$$

$$M_{12} = -\sin(\theta/2)/\cos(\theta) \tag{6}$$

$$M_{21} = \sin(\theta/2) - (\cos(\theta/2) * \sin(\theta))/\cos(\theta) \tag{7}$$

$$M_{22} = \cos(\theta/2)/\cos(\theta) \tag{8}$$

The correction factors determined according to Equations 5-8 may be used to adjust the values of both servo burst signals, using Equations 2 and 3, to shift the values to a target position that corresponds to that of no servo pattern distortion. In this manner, the correction factors determined according to Equations 5-8 may be used to adjust both measured P and Q values 610 when calculating adjusted P and Q values 620, e.g., when one or more of the respective measures of servo pattern distortion of all the tracks associated with a head are above a threshold value.

In another exemplary embodiment, the correction factors are determined based on the estimated servo burst signal shift according to Equations 9-12:

$$M_{11} = 1 \tag{9}$$

$$M_{12} = 0 \tag{10}$$

$$M_{21} = -\sin(\theta)/\cos(\theta) \tag{11}$$

$$M_{22} = 1/\cos(\theta) \tag{12}$$

The correction factors determined according to Equations 9-12 may be used to adjust the value of one of the servo burst signals, using Equations 2 and 3, to shift the value to a target position that corresponds to that of no servo pattern distortion. For example, by using correction factors determined according to Equations 9-12, the adjusted P value will equal the measured P value, whereas the adjusted Q value will not equal the measured Q value. In this manner, only one of the values is changed from its measured value to its adjusted value. In this manner, the correction factors determined according to Equations 9-12 may be used to change only one of the measured P and Q values 610 when calculating adjusted P and Q values 620, e.g., when all of the respective measures of servo pattern distortion of all the tracks associated with a head are below a threshold value. Implementations are not limited to using correction factors that change only the Q value and not the P value, and other equations may similarly be derived for determining corrections factors that change only the P value and not the Q value.

In yet another exemplary embodiment, the correction factors are determined based on the estimated servo burst signal shift according to Equations 13-16:

$$M_{11} = 1 \tag{13}$$

$$M_{12} = 0 \tag{14}$$

$$M_{21} = -\theta * M_{22} \tag{15}$$

$$M_{22} = 1 + \theta * \theta/2 \tag{16}$$

Similar to Equations 9-12, the correction factors determined according to Equations 13-16 may be used to adjust the value of one of the servo burst signals, using Equations 2 and 3, to shift the value to a target position that corresponds to that of no servo pattern distortion. Equations 13-16 employ a mathematical simplification of Equations 9-12 based on the observation that $1/(1-x)$ can be approximated as $1+x$ when x is very small. Equations 13-16 may be used to improve performance in the disk drive by simplifying the mathematical processing requirements, e.g., by eliminating sine and cosine operations.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method. Steps of method 80, and other methods of this disclosure, may be performed individually or in combination by one or more processing devices. For example, in some implementations, the one or more processing devices may comprise a single processing device that performs all the steps of such a method. In some implementations, different respective ones of the one or more processing devices may perform different respective steps of such a method. For example, in some implementations, the one or more processing devices may comprise at least a first processing device that performs a first subset of the steps of such a method and at least a second processing device that performs a second subset of the steps of the method. In some implementations, one or more steps of such a method may be performed by two or more of the one or more processing devices acting in combination.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device comprising:
a disk;
a head actuated over the disk; and
one or more processing devices, individually or in combination, configured to:
obtain a first value of a first servo burst signal and a second value of a second servo burst signal associated with a servo pattern in a track of the disk;
calculate an adjusted first value and an adjusted second value by adjusting one or both of the first value and the second value based on a measure of servo pattern distortion associated with the track;
generate a position error signal (PES) using the adjusted first value and the adjusted second value; and
control a position of the head over the track using the PES.

2. The data storage device of claim 1, wherein the servo pattern distortion is caused by laser mode hop occurring during writing of servo patterns in the track.

3. The data storage device of claim 1, wherein the measure of servo pattern distortion associated with the track is determined based on a difference between crossing level amplitudes of a first servo burst signal profile and a second servo burst signal profile associated with the track, and wherein the adjusted first value and the adjusted second value correspond to the first servo burst signal profile and the second servo burst signal profile being spaced apart from one another by a half-track distance.

4. The data storage device of claim 1, wherein the one or more processing devices, individually or in combination, are further configured to determine an estimated servo burst signal shift according to:

$$\theta = \pi \Delta / k$$

wherein:
θ is the estimated servo burst signal shift;
Δ is the measure of servo pattern distortion associated with the track; and
k is a scaling factor.

5. The data storage device of claim 4, wherein the adjusted first value and the adjusted second value are calculated according to:

$$P_{adj} = P * M_{11} + Q * M_{12}$$
$$Q_{adj} = P * M_{21} + Q * M_{22}$$

wherein:

$$M_{11} = \cos(\theta/2) + (\sin(\theta/2) * \sin(\theta))/\cos(\theta), M_{12} = -\sin(\theta/2)/\cos(\theta);$$
$$M_{21} = \sin(\theta/2) - (\cos(\theta/2) * \sin(\theta))/\cos(\theta), M_{22} = \cos((\theta/2)/\cos(\theta);$$

θ is the estimated servo burst signal shift;
$P_{adj}$ is the adjusted first value;
$Q_{adj}$ is the adjusted second value;
P is the first value; and
Q is the second value.

6. The data storage device of claim 4, wherein the adjusted first value and the adjusted second value are calculated according to:

$$P_{adj} = P * M_{11} + Q * M_{12}$$
$$Q_{adj} = P * M_{21} + Q * M_{22}$$

wherein:

$$M_{21} = -\sin(\theta)/\cos(\theta), M_{22} = 1/\cos(\theta);$$

θ is the estimated servo burst signal shift;
$P_{adj}$ is the adjusted first value;
$Q_{adj}$ is the adjusted second value;
P is the first value; and
Q is the second value.

7. The data storage device of claim 4, wherein the adjusted first value and the adjusted second value are calculated according to:

$$P_{adj} = P * M_{11} + Q * M_{12}$$

$$Q_{adj} = P * M_{21} + Q * M_{22}$$

wherein:

$$M_{21} = -\theta * M_{22}, M_{22} = 1 + \theta * \theta/2$$

θ is the estimated servo burst signal shift;
$P_{adj}$ is the adjusted first value;
$Q_{adj}$ is the adjusted second value;
P is the first value; and
Q is the second value.

8. The data storage device of claim 1, wherein:
the disk includes plural tracks associated with the head;
each respective one of the tracks has a respective measure of servo pattern distortion associated with the respective one of the tracks; and
the adjusting one or both of the first value and the second value comprises adjusting only the first value based on all the respective measure of servo pattern distortion being less than a threshold.

9. The data storage device of claim 1, wherein:
the disk includes plural tracks associated with the head;
each respective one of the tracks has a respective measure of servo pattern distortion associated with the respective one of the tracks; and
the adjusting one or both of the first value and the second value comprises adjusting both the first value and the second value based on at least one of the respective measures of servo pattern distortion being greater than a threshold.

10. The data storage device of claim 1, wherein the adjusted first value and the adjusted second value are calculated using a rotation matrix that includes correction factors that are determined based on the measure of servo pattern distortion associated with the track, and wherein the adjusted first value and the adjusted second value correspond to a reduction in the measure of servo pattern distortion.

11. A method comprising:
obtaining a first value of a first servo burst signal and a second value of a second servo burst signal associated with a servo pattern in a track of a disk of a disk drive;
calculating an adjusted first value and an adjusted second value by adjusting one or both of the first value and the second value based on a measure of servo pattern distortion associated with the track;
generating a position error signal (PES) using the adjusted first value and the adjusted second value; and
controlling a position of a head over the track using the PES,
wherein the obtaining, the calculating, the generating, and the controlling are performed by one or more processing devices individually or in combination.

12. The method of claim 11, wherein the servo pattern distortion is caused by laser mode hop occurring during writing of servo patterns in the track.

13. The method of claim 11, wherein the measure of servo pattern distortion associated with the track is determined based on a difference between crossing level amplitudes of a first servo burst signal profile and a second servo burst signal profile associated with the track.

14. The method of claim 11, wherein:
the disk includes plural tracks associated with the head;
each respective one of the tracks has a respective measure of servo pattern distortion associated with the respective one of the tracks; and
the adjusting one or both of the first value and the second value comprises adjusting only the first value based on all the respective measure of servo pattern distortion being less than a threshold.

15. The method of claim 11, wherein:
the disk includes plural tracks associated with the head;
each respective one of the tracks has a respective measure of servo pattern distortion associated with the respective one of the tracks; and
the adjusting one or both of the first value and the second value comprises adjusting both the first value and the second value based on at least one of the respective measures of servo pattern distortion being greater than a threshold.

16. The method of claim 11, wherein the adjusted first value and the adjusted second value are calculated using correction factors that are determined based on the measure of servo pattern distortion associated with the track.

17. One or more processing devices, individually or in combination, comprising:
means for obtaining a first value of a first servo burst signal and a second value of a second servo burst signal associated with a servo pattern in a track of a disk of a disk drive;
means for determining a measure of servo pattern distortion associated with the track;
means for calculating an adjusted first value and an adjusted second value by adjusting one or both of the first value and the second value based on the measure of servo pattern distortion associated with the track;
means for generating a position error signal (PES) using the adjusted first value and the adjusted second value; and
means for controlling a position of a head over the track using the PES.

18. The one or more processing devices of claim 17, wherein the servo pattern distortion is caused by laser mode hop occurring during writing of servo patterns in the track.

19. The one or more processing devices of claim 17, wherein the measure of servo pattern distortion associated with the track is determined based on a difference between crossing level amplitudes of a first servo burst signal profile and a second servo burst signal profile associated with the track.

20. The one or more processing devices of claim 17, wherein the adjusted first value and the adjusted second value are calculated using correction factors that are determined based on the measure of servo pattern distortion associated with the track.

* * * * *